(12) United States Patent
Giles

(10) Patent No.: US 7,167,083 B2
(45) Date of Patent: Jan. 23, 2007

(54) RECORDING AND INDICATING THE STATE OF AN APPARATUS REMOTELY

(75) Inventor: James Ryan Giles, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 10/260,810

(22) Filed: Sep. 30, 2002

(65) Prior Publication Data

US 2004/0061604 A1    Apr. 1, 2004

(51) Int. Cl.
*B60R 25/10* (2006.01)

(52) U.S. Cl. .......................... 340/426.15; 340/426.36; 307/10.1; 398/107

(58) Field of Classification Search ............. 340/425.5, 340/426.15, 426.28, 426.36, 989, 825.72; 307/9.1, 10.1–10.5; 398/106, 107; 70/256, 70/257, 262, 264
See application file for complete search history.

(56) References Cited

U.S. PATENT DOCUMENTS

| | | | |
|---|---|---|---|
| 3,622,998 A | 11/1971 | Kortman | |
| 4,005,885 A | 2/1977 | Austin, Jr. | |
| 4,593,543 A | 6/1986 | Stefanek | |
| 5,025,426 A * | 6/1991 | Blumberg et al. | ............. 368/10 |
| 5,870,020 A * | 2/1999 | Harrison, Jr. | .......... 340/426.21 |
| 5,898,365 A * | 4/1999 | Niederlein | ............... 340/425.5 |
| 6,076,385 A | 6/2000 | Pedroso | |
| 6,140,939 A | 10/2000 | Flick | |
| 6,144,315 A | 11/2000 | Flick | |
| 6,180,938 B1 | 1/2001 | Crowther | |
| 6,181,254 B1 | 1/2001 | Vogele | |
| 6,232,875 B1 * | 5/2001 | DeZorzi | ..................... 340/442 |
| 6,243,022 B1 * | 6/2001 | Furukawa | ............. 340/825.72 |
| 6,259,362 B1 * | 7/2001 | Lin | ............................ 340/457 |
| 6,320,514 B1 | 11/2001 | Flick | |
| 6,438,467 B1 * | 8/2002 | Pacsai | ........................ 340/442 |
| 6,556,135 B1 * | 4/2003 | Attring et al. | ........... 340/539.1 |
| 6,631,271 B1 * | 10/2003 | Logan | ..................... 455/456.1 |
| 6,724,322 B1 * | 4/2004 | Tang et al. | ................. 340/989 |
| 6,774,779 B1 * | 8/2004 | Lin | ............................ 340/447 |
| 6,784,805 B1 * | 8/2004 | Harris et al. | ........... 340/825.69 |
| 6,844,807 B1 * | 1/2005 | Inoue et al. | ................. 340/3.7 |

* cited by examiner

*Primary Examiner*—Daniel Wu
*Assistant Examiner*—Eric M. Blount
(74) *Attorney, Agent, or Firm*—Ference & Associates

(57) ABSTRACT

A system for indicating a past state of an apparatus through the use of a remote device by indicating the state with the remote device whether or not the remote device is still within communications range of the apparatus. In one embodiment, an indication can be made as to whether or not a vehicle door has been locked by providing such an indication at a remote keyless entry key remote control.

18 Claims, 5 Drawing Sheets

RECORDING AND INDICATING THE STATE OF AN APPARATUS REMOTELY

FIELD OF THE INVENTION

The present invention relates to remote state indication of an apparatus. It more particularly relates to remote devices coupled with systems to obtain state conditions of system features such that these state conditions can be later indicated by the remote devices even when they are no longer able to communicate with the systems.

BACKGROUND OF THE INVENTION

Many vehicles have remote keyless entry systems which allow vehicle drivers and/or passengers to lock and unlock doors and/or open trunks or doors and/or arm and disarm security systems. For most such systems, the vehicle provides visual and/or audible indications when the state of the vehicle has changed, such as a horn chirp or headlamp flash when the doors are locked. Unfortunately, due to repetition of the process and distraction, vehicle drivers and/or passengers often forget whether or not they have left the vehicle in a desired state, even with the indication that is given by the vehicle. For example, an individual leaving a vehicle in a busy and crowded parking lot might desire the vehicle to be locked with the security system armed, but because of distraction the state condition later cannot be remembered, thereby causing anxiety and/or the need to return to the vehicle to check the state. To confirm the state condition, it is usually necessary to visually inspect the vehicle or to use the remote keyless entry system to issue the command for the desired state so that the vehicle responds with its standard indicators (such as horn chirp or headlamp flashing). The results of this sequence of events possibly include unnecessary anxiety for the vehicle driver and/or passengers, a waste of time and energy, and/or a substantial financial loss if a vehicle is unknowingly left unlocked.

A similar problem exists for many other devices. For example, it is often desirable to confirm the state of door locks for homes or businesses because of the substantial financial loss that may occur if they are unknowingly left unlocked. Additionally, state conditions of appliances, such as irons or stoves, may be desired from a remote location since significant property damage could result if such appliances are left on unattended.

Anecdotally, it is believed that the various phenomena described above are widespread. However, to date, there appears to have been no recognition that this is a technical problem that may have a technical solution. While many apparatus have mechanisms to indicate state change when such occurs (such as a horn chirp when vehicle doors are locked), nothing has apparently been done to record state conditions in a remote device so that the state can be confirmed without being near the apparatus.

SUMMARY OF THE INVENTION

There is now broadly contemplated, in accordance with at least one preferred embodiment of the present invention, a system and method in which the last known state condition of an apparatus, such as a vehicle door lock, can be indicated with a remote device such as a wireless remote control.

In another aspect, the invention provides a last-known state condition indication for a given apparatus by way of a remote device, regardless of proximity to the apparatus and even if the remote device cannot communicate with the apparatus at the time of indication. The apparatus communicates state conditions to the remote device when it is "in-range," and the remote device can display the recorded state conditions whether it is "in-range" or "out of range". (When the apparatus can communicate information to the remote device, the remote device is said to be in-range. A remote device is said to be out of range if the apparatus cannot communicate information to the remote device.)

In accordance with at least one additional aspect of the present invention, feedback is provided to a remote device indicating that an issued command has been received by an apparatus and that the command has indeed led to the desired result.

In accordance with an advantageous refinement of the present invention, when a vehicle is locked with a remote keyless entry system, a wireless remote control for the system may record in memory that the doors had been locked. For example, if the wireless remote control is used to lock the doors, a transmitter in the vehicle could broadcast a signal to receivers of all of the wireless remote controls for the remote keyless entry system when the door is locked, with any such in-range remote controls recording and indicating the state condition. The state indicator on the remote control could then indicate the state condition stored in the memory when the state condition is requested, in this case showing if the last know state condition of the vehicle door lock was "locked" or "unlocked".

BRIEF DESCRIPTION OF THE DRAWINGS

Various aspects, features, and advantages of the present invention will become apparent upon further consideration of the following detailed description of the invention when read in conjunction with the drawing figures, in which.

DESCRIPTION OF THE INVENTION

Generally, it should be appreciated that there is broadly contemplated in accordance with at least one presently preferred embodiment of the present invention the capability of providing an indication of the state condition of an apparatus by including a state indicator and memory on a remote device which can indicate the last known state condition regardless of its proximity to the apparatus.

Figure 1:
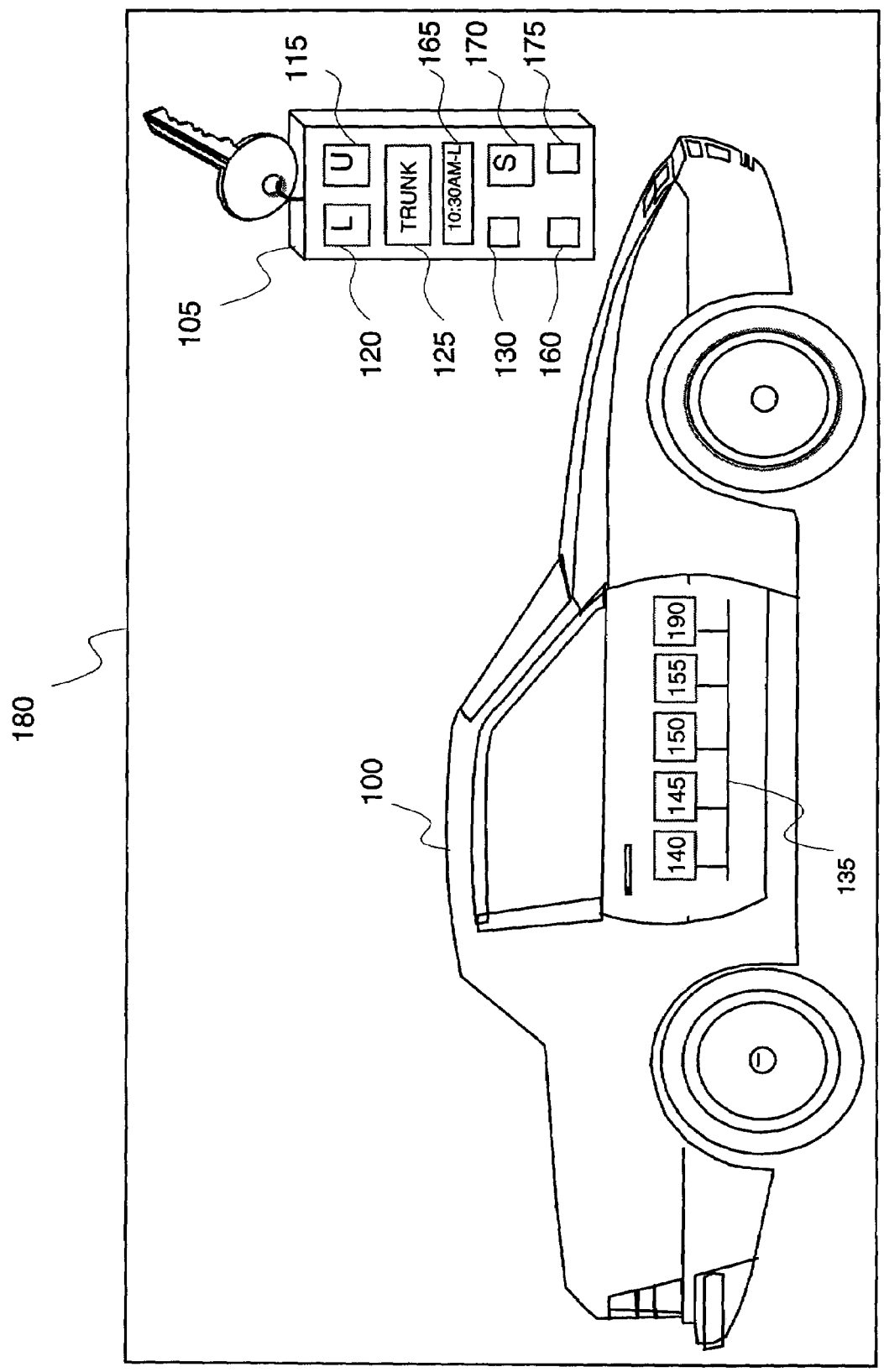
FIG. 1 shows a schematic diagram of a vehicle with a remote keyless entry system and wireless remote control that records and indicates the state condition of the vehicle door lock.

FIG. 1 shows a schematic diagram of a vehicle remote keyless entry system 180 with wireless remote control 105 that records and indicates the state condition of the vehicle door locks or other vehicle conditions, according to a preferred embodiment of a system of the present invention. The vehicle remote keyless entry system 180 preferably includes an apparatus that assumes different states, e.g., in the form of a vehicle system 100, and a remote device in the form of a wireless remote control 105. The vehicle system 180 preferably comprises many components that are part of existing vehicle remote keyless entry systems, such as at least one processing unit 140, a wireless receiver 145, at least one actuator 150 for locking/unlocking doors or cargo areas, and at least one vehicle control bus 135 which links the components together. The vehicle system 100, in accordance with an embodiment of the present invention, also preferably incorporates a wireless transmitter 155 that is connected to at least one of the other components by a vehicle control bus 135, and at least one state monitor 190 that monitors the state of features such as door locks.

Typically, a wireless remote control 105 for existing vehicle remote keyless entry systems may comprise at least one lock button 120, at least one unlock button 115, at least one cargo release button 125, and a wireless transmitter 130 for transmitting signals to the wireless receiver 145 in the vehicle system 100. However, in accordance with at least one embodiment of the present invention, there may also preferably be incorporated a wireless receiver 160, a processing unit 175 with memory, at least one state indicator 165, and at least one state indicator activator 170.

As in existing vehicle remote keyless entry systems, when a button on the wireless remote control 105 is pressed, signals are sent from the wireless transmitter 130 to the wireless receiver 145. The signals may be decoded by the wireless receiver 145 or transmitted across a vehicle control bus 135 to an processing unit 140 for processing. Signals are then sent to at least one of the actuators 150 to lock or unlock a door or open a cargo area. Additional buttons or activators may be included that perform additional vehicle functions such as opening a van door or arming a security system.

However, in accordance with at least one preferred embodiment of the present invention, when a processing unit 140 in the vehicle system receives a signal from a monitor 190 indicating that the state of the vehicle system has changed, such as when the doors have locked, a signal indicating the state condition is sent from the wireless transmitter 155 to any in-range wireless receivers 160 on wireless remote controls 105 that are part of the system. The signal from the wireless receiver is decoded and the state condition is stored in memory connected to the processing unit 175. When a state indicator button 170 is pressed, the state condition is retrieved from the processing unit 175 memory and indicated on a state indicator 165, whether or not the wireless remote control 105 is in-range. Here, the state indicator may be a digital readout which displays the time of the last known state condition signal and the last known state condition (in the figure, the last known state condition signal was at 10:30 a.m. and the state condition was locked represented by the letter "L").

A state indicator activator 170 may be a separate button, or it may be a button that shares many functions. For example, the lock button 120 may cause a lock signal to be issued if it is pressed and quickly released, but cause the state condition to be indicated on a state indicator 165 if it is pressed and held for a certain length of time. The state indicator 165 may also take many other forms not limited to at least one light emitting diode that flashes or uses certain colors to indicate different state conditions (for example, green for locked and red for unlocked), a light, a vibration transducer, a speech message generator, an audible signal generator, a text display, or a graphics display. In some embodiments, the state indicator 165 may be activated by a state indicator activator 170 such as button, a motion sensor, a pressure sensor or the state indicator 165 may be activated periodically according to a timer or continually without the need for a state indicator activator 170. One of the primary advantages associated with this and similar systems is that the last known state condition can be determined from the wireless remote control, even if the wireless remote control is out of range at the time of indication.

Figure 2:
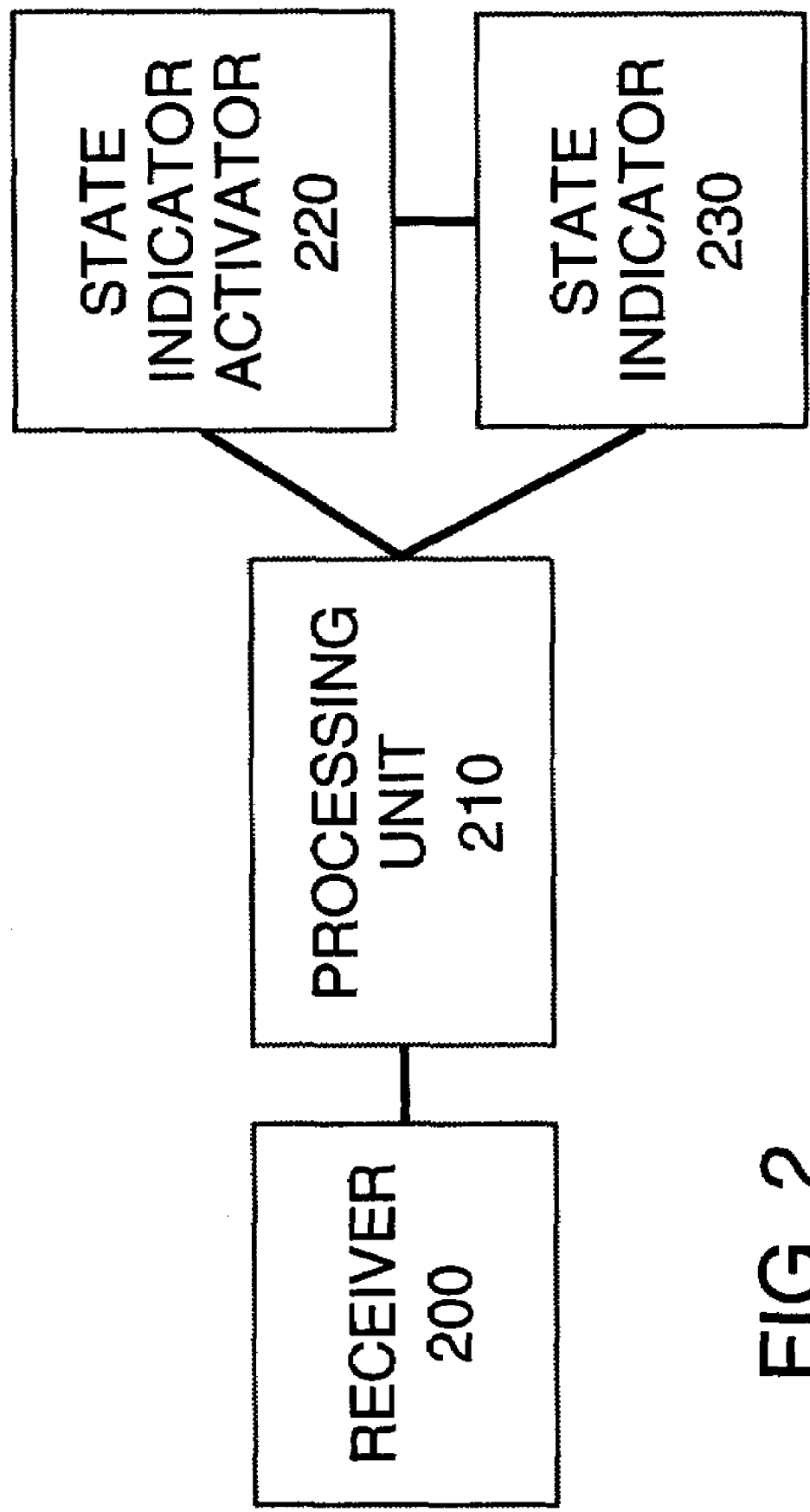
FIG. 2 shows a block diagram of a remote device for the state indication system.

FIG. 2 shows a block diagram of a remote device for the state indication system. A receiver 200 receives state condition signals. The state condition signals are decoded and sent to a processing unit 210 where the state condition is stored in memory. The state condition stored in the memory for the processing unit 210 may be indicated using the state indicator 230 which may be activated by a state indicator activator 220. Possibly, the state indicator activator 220 may not be present, in which case the state indicator 230 continually displays the state condition stored in the processing unit 210 memory.

Figure 3:
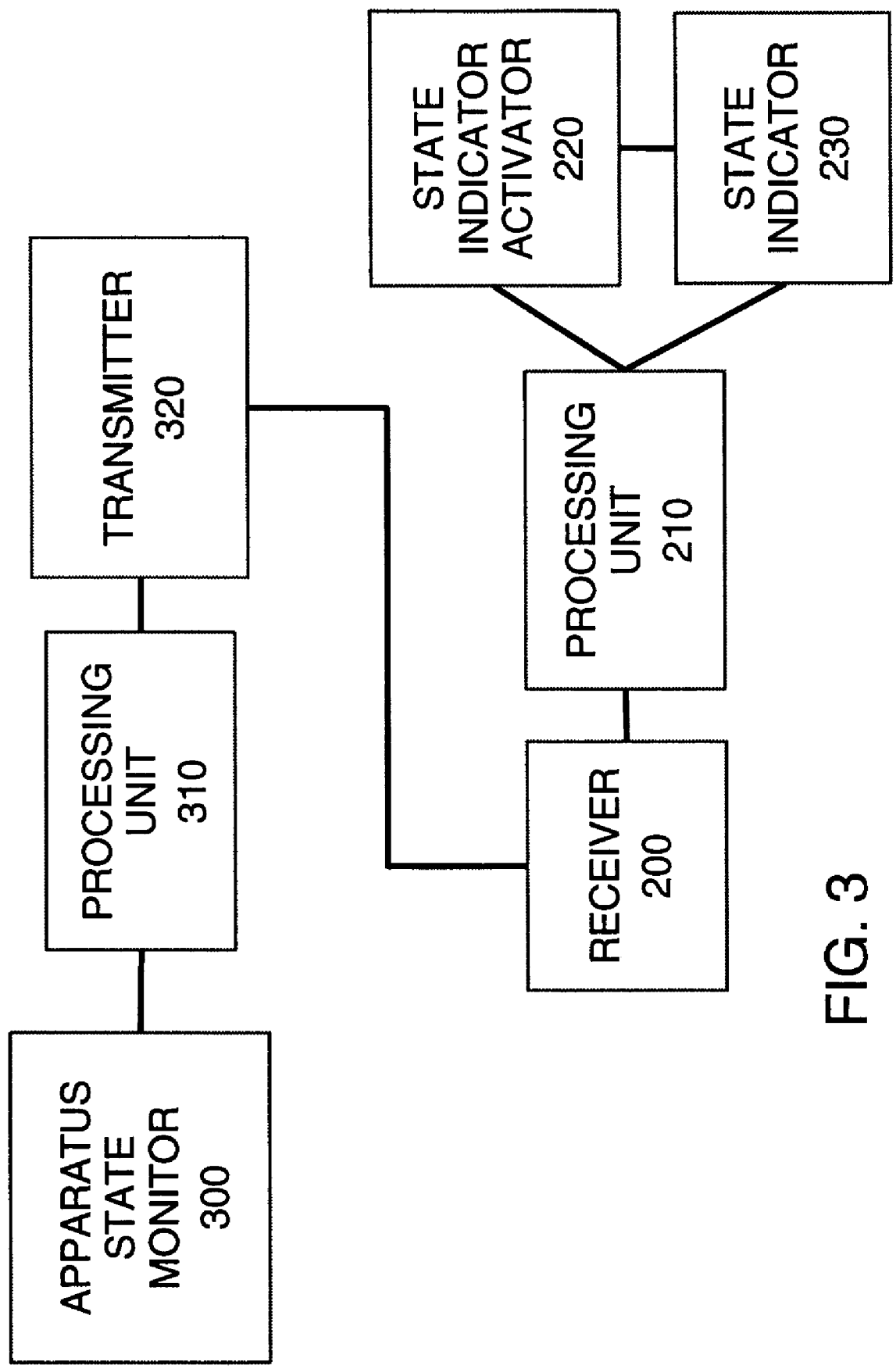
FIG. 3 shows a block diagram of a state indication system with transmitter and apparatus state monitor.

FIG. 3 shows a block diagram of a state indication system with transmitter and state monitor. An apparatus state monitor 300 monitors one or more states of an apparatus and communicates the states to a processing unit 310. The apparatus state monitor may employ sensors or intercept state change messages from a control unit. The processing unit 310 sends messages indicating state conditions to a transmitter 320 according to a schedule. The processing unit 310 may send said signals after receiving messages from the apparatus state monitor or send them periodically. The transmitter sends the state condition messages which can be received by receivers 200. The receivers 200, processing unit 210, state indicator activator 220, and state indicator 230 are as described in FIG. 2.

Figure 4:
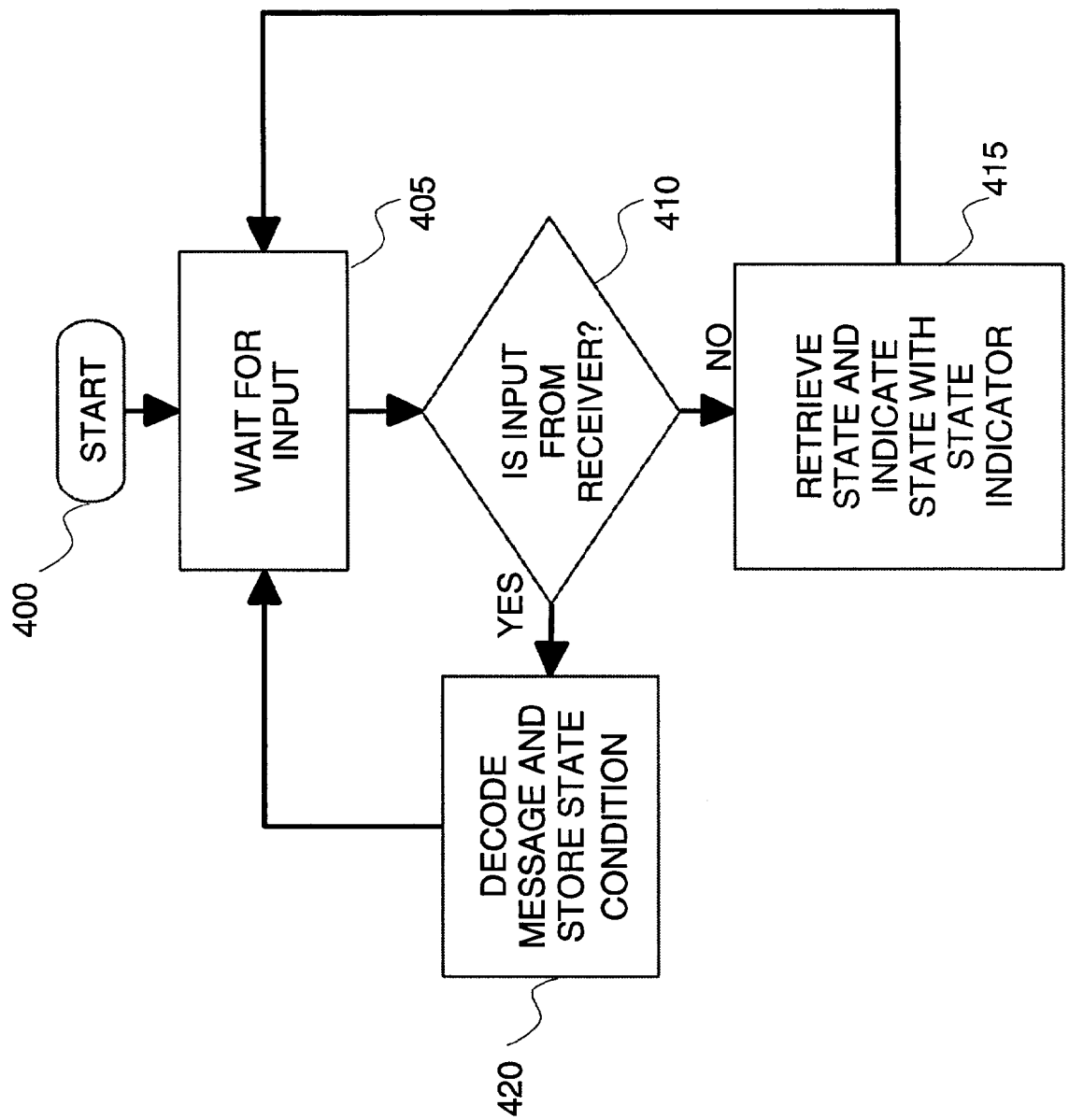
FIG. 4 shows a flowchart that illustrates the actions taken by a remote device.

FIG. 4 shows a flowchart that illustrates the actions taken by a remote device. The flowchart is entered in step 400 whenever the remote device is initialized. In step 405, the remote device waits for input. Upon receiving input, the remote device checks to see if the input is from a receiver in step 410. If the input is from the receiver in step 410, then in step 420 the message received by the receiver is decoded and the resulting state condition is stored in memory. After step 420, step 405 is executed. If the input is not from the receiver in step 410, then in step 415 the input is processed to determine which state condition is desired and the state condition is retrieved from memory and indicated with the state indicator. After step 415, step 405 is executed. It should be understood that other functions, perhaps of a minor, conventional or subsidiary nature, may be performed by the remote device but are not described here.

Figure 5:
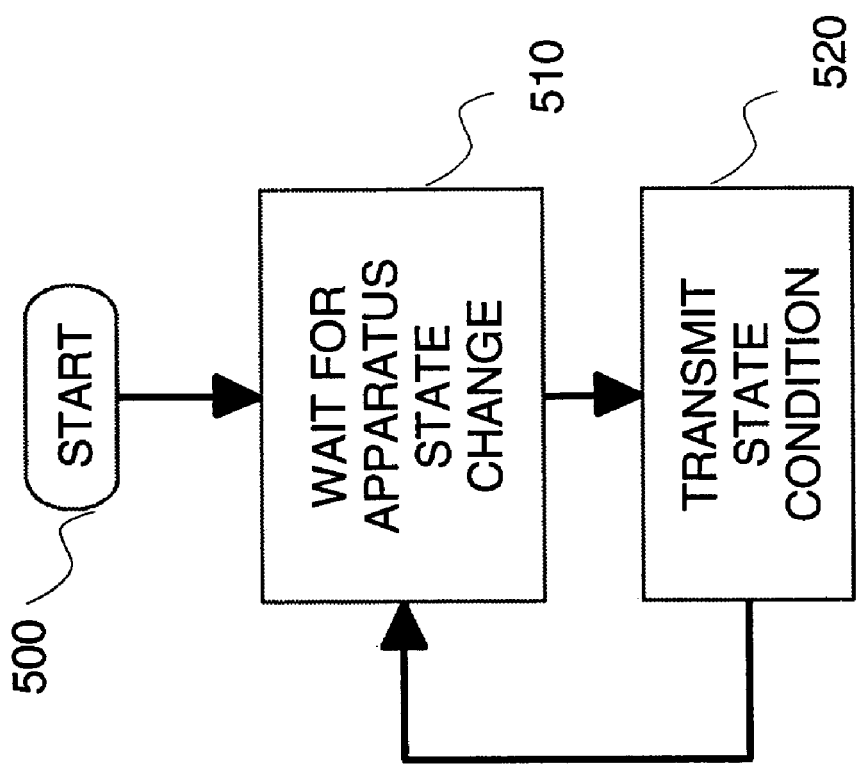
FIG. 5 shows a flowchart that illustrates the actions taken by an apparatus.

FIG. 5 shows a flowchart that illustrates the actions taken by an apparatus 100. The flowchart is entered in step 500 whenever the apparatus is initialized. In step 510, the apparatus state monitor waits for an apparatus state change. Next, in step 520, the apparatus state change is processed into a state condition message and transmitted. After step 520, step 510 is executed.

It should be understood that a very broad range of applications may be addressed within the scope of the present invention. Thus, although the foregoing description addresses and alludes to various specific arrangements and methods, the intent and concept of the present invention are suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of various embodiments of the present invention. Other beneficial results can be realized by applying the disclosed invention in a different manner or modifying the invention in ways known to those familiar with the art.

What is claimed is:

1. A method of indicating a state of an apparatus, said method comprising the steps of:
    monitoring, at said apparatus, changes to at least one state condition among a set of state conditions;
    providing a plurality of remote devices, said plurality of remote devices including at least one in-range remote device;
    transmitting a state condition to said plurality of remote devices, wherein said step of transmitting occurs after a change in said state condition independent of whether said change in state condition resulted as a function of said plurality of remote devices;
    storing the at least one state condition of said apparatus at said plurality of remote devices;
    at said plurality of remote devices, indicating the at least one state condition of said apparatus regardless of whether said remote device is in-range with respect to said apparatus or out of range with respect to said apparatus; and
    transmitting the at least one state condition to said at least one in-range remote device from at least one other of said remote devices.

2. The method according to claim 1, wherein said step of transmitting comprises transmitting the at least one state condition to at least one other device apart from said plurality of remote devices.

3. The method according to claim 1, further comprising:
    providing at least one state indication activator; and
    initiating said step of indicating with said at least one state indication activator.

4. The method according to claim 1, wherein said step of transmitting occurs after said change in the state condition regardless of whether any of said remote devices is in-range.

5. The method according to claim 1, wherein said step of transmitting comprises employing a schedule for transmissions.

6. The method according to claim 1, wherein said step of transmitting comprises sending state conditions only when at least one remote device is detected as being in-range.

7. A system comprising:
    a monitor which monitors, at an apparatus, changes to at least one state condition among a set of state conditions;
    a plurality of remote devices comprising:
    a receiver to receive at least one state condition of an external apparatus;
    a memory to store said at least one state condition;
    at least one state indicator to indicate at least one state condition from said memory even when said remote device is out of range,
    wherein said system farther comprises a transmitter, which transmits said at least one state condition to said remote device upon the occurrence of a change in said state condition independent of whether said change in state condition resulted as a function of said at least one remote device; and
    further wherein at least one of said plurality of remote devices is in-range, said plurality of remote devices being capable of transmitting the at least one state condition to said at least one in-range remote device from at least one other of said remote devices.

8. The system according to claim 7, wherein said transmitter is adapted to transmit said at least one state condition to at least one device apart from said set of remote devices.

9. The system according to claim 7, wherein at least one state condition is stored in said memory by overwriting at least one previously stored state condition.

10. The system according to claim 7, wherein said external apparatus is a vehicle, said at least one state condition including a state of door locks, and said at least one remote device comprises a remote control for a vehicle remote keyless entry system.

11. The system according to claim 7, wherein said external apparatus is a set of doors for a building, said at least one state condition including a state of door locks, and said at least one remote device comprises a remote control for a building remote keyless entry system.

12. The system according to claim 7, wherein said transmitter is adapted to transmit said state condition regardless of whether any remote device is in-range.

13. The system according to claim 7, wherein said transmitter is adapted to transmit a state condition according to a schedule regardless of whether any remote device is in-range.

14. The system according to claim 7, wherein said transmitter is adapted to transmit state conditions only when at least one in-range remote device is detected.

15. The system according to claim 7, wherein said at least one remote device further comprises at least one state indicator activator.

16. A remote device comprising:
    a receiver to receive at least one state condition of an external apparatus upon a change to at least one state condition among a set of state conditions being monitored, at said apparatus, by a monitor independent of whether said change in state condition resulted as a function of the remote device;
    a memory to store said at least one state condition; and
    a state indicator to indicate at least one state condition from said memory even when said remote device is out of range,
    wherein said remote device is capable of transmitting the at least one state condition to at least one other remote device.

17. The method of claim 3, wherein said indicating with said at least one state indication activator is displayed via a state indicator of the remote device and said display including the time when said change in state condition occurred.

18. The method according to claim 3, wherein said indication activator is multifunctional.

* * * * *